United States Patent [19]

Perry

[11] Patent Number: 5,463,859
[45] Date of Patent: Nov. 7, 1995

[54] FRUIT PICKING APPARATUS

[76] Inventor: Darwin L. Perry, 9823 Wrangler Dr., Sun City, Ariz. 85323

[21] Appl. No.: 344,500

[22] Filed: Nov. 23, 1994

[51] Int. Cl.[6] ................................................. A01D 46/24
[52] U.S. Cl. .............................................. 56/332; 56/339
[58] Field of Search ........................... 56/332, 335, 338, 56/339

[56] References Cited

U.S. PATENT DOCUMENTS

| | | | |
|---|---|---|---|
| 79,292 | 6/1868 | Lament et al. | 56/339 |
| 914,205 | 3/1909 | Tidd. | |
| 1,338,106 | 8/1921 | Emerson. | |
| 1,509,972 | 9/1924 | Michelsen | 56/339 |
| 2,346,986 | 4/1944 | Metzger | 56/335 |
| 2,900,780 | 8/1959 | Kaiser | 56/339 |
| 2,935,836 | 5/1960 | Angel | 56/339 |
| 3,449,896 | 6/1969 | Burgess | 56/339 |
| 3,638,409 | 2/1972 | Kuska | 56/339 |
| 4,242,856 | 1/1981 | Patton | 56/339 |
| 4,928,461 | 5/1990 | King | 56/339 |
| 5,280,697 | 1/1994 | Miller | 56/332 X |

*Primary Examiner*—George A. Suchfield
*Attorney, Agent, or Firm*—Parsons & Associates; Don J. Flickinger; Robert A. Parsons

[57] ABSTRACT

A fruit picking apparatus for easily penetrating foliage to access fruit, and for removing fruit from a stem, including a generally cylindrical receptacle formed as a one piece construction and having a closed upper end, a closed lower end and a side wall extending therebetween, the upper end and the lower end being sloped to facilitate penetration of foliage, an opening for receiving fruit formed in the side wall intermediate the upper end and the lower end and terminating proximate the upper end with a convergent slot extending in the direction of the upper end, a shaft, and a threaded socket extending from the lower end of the receptacle along a longitudinal axis, for removably receiving a threaded end of the shaft.

20 Claims, 1 Drawing Sheet

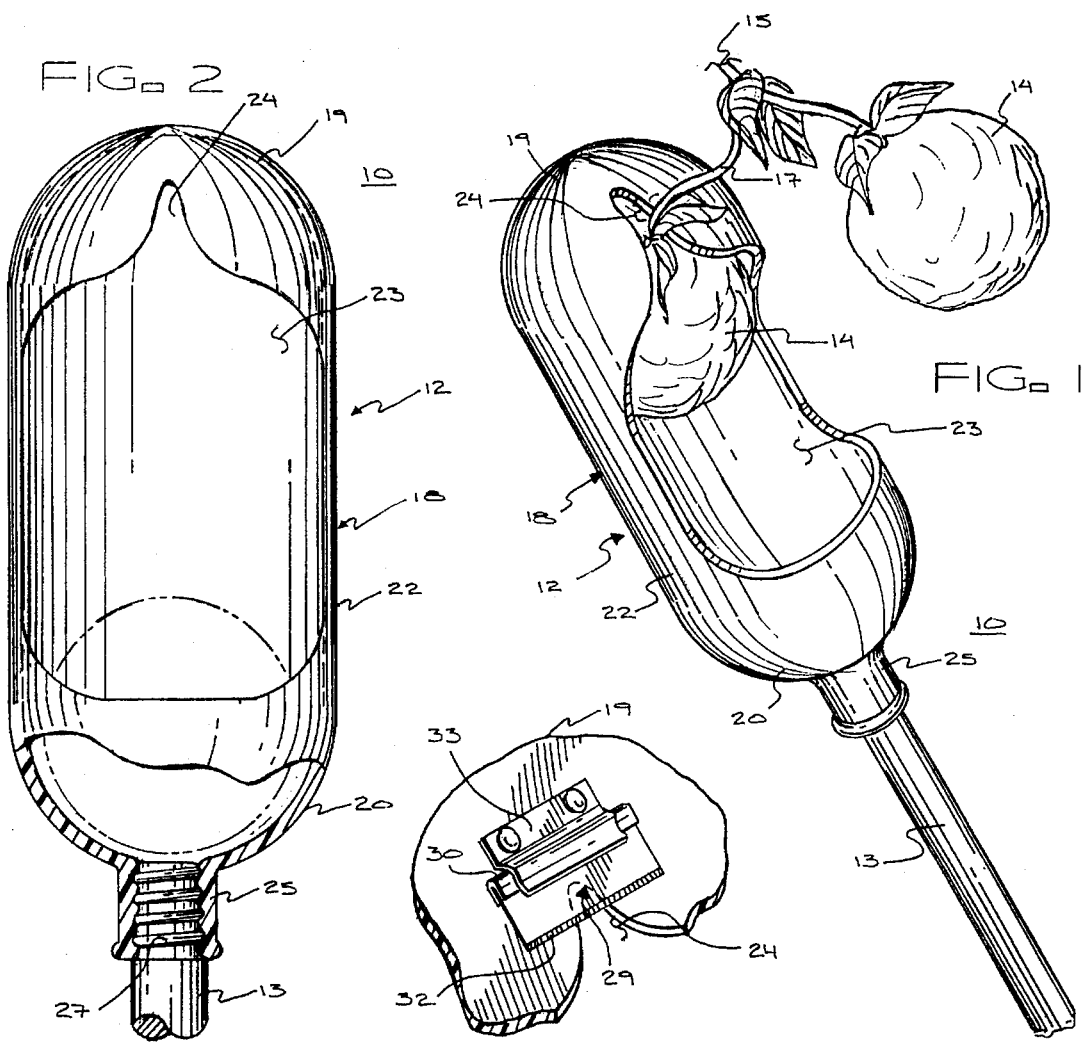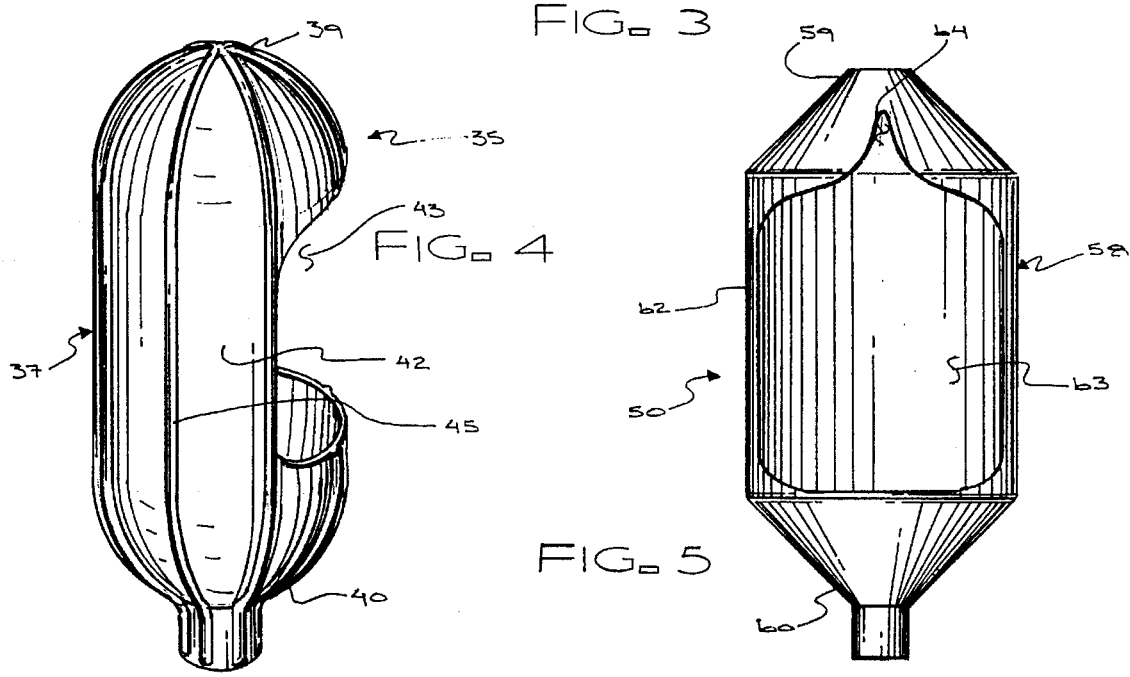

FRUIT PICKING APPARATUS

BACKGROUND OF THE INVENTION

1. Field of the Invention

This invention relates to fruit harvesting devices.

More particularly, the present invention relates to an apparatus for extending the reach of an individual and for detaching individual fruit from trees in a manner which prevents damaging the fruit.

In a further and more specific aspect, the present invention concerns an apparatus for penetrating dense foliage to access hard to reach fruit.

2. The Prior Art

Within the art of harvesting fruit, many and diverse devices have been developed. These devices have been developed to overcome problems associated with picking fruit by hand. Traditionally, an individual picking fruit simply grasps the fruit and twists or pulls it off the stem attaching it to the tree. This works quite well for easily reached low hanging fruit. However, the vast majority of fruit on a tree is generally out of easy reach. To obtain fruit from the higher branches of a tree, an individual must elevate himself to the location of the fruit such as by climbing the tree, or using a ladder. These methods, while permitting more fruit to be picked, are still inadequate. When climbing the tree only fruit close to the main body of the tree are accessible. Fruit further out are still inaccessible to the picking individual. This is somewhat true of the ladder as well, which when leaned against the trunk of the tree prevents picking of fruit from the outer reaches of the tree, and when leaned against the branches of a smaller tree prevent picking fruit deeper within the foliage. Also, the ladder must be shifted constantly to bring different parts of the tree within reach. Furthermore, each method requires a degree of dexterity and agility, and potential for injuries from falls exists.

To overcome these problems, a large variety of pickers have been developed. Many of these fruit picking devices include containers having open tops, mounted on shafts. Some fruit pickers require a horizontal sweeping movement to engulf the fruit, while others require a vertical movement. In either device, an individual grasps the shaft and moves the container to the fruit. The fruit enters the container through the top and is pulled from the tree. Many devices include an element for removing the fruit from the stem, such as hooks.

These devices are very successful, allowing an individual to remain on the ground and still pick hard to reach fruit. The problem typically encountered with these types of devices is difficulty in maneuvering the container through the branches of the tree to the fruit. Many types of trees have very dense foliage. This is especially true of citrus trees. Devices requiring sweeping horizontal movement, are very ineffectual at reaching fruit, and are only useful in open area of the tree where fruit are hanging free and unobstructed. Devices which are thrust vertically upward are more effective, but their shape and use and location of fruit detaching elements inhibits penetration through dense foliage, often rendering access to fruit in dense foliage difficult or impossible. Vertical upward movement through dense foliage is hindered by the open top and fruit detaching elements which catch branches and other projections. The picking device cannot simply be pushed through dense foliage for these stated reasons.

As can be determined from the above discourse, conventional fruit picking devices, while useful, have limitations. These limitations are prominently displayed when used to attempt picking fruit from trees having dense foliage.

It would be highly advantageous, therefore, to remedy the foregoing and other deficiencies inherent in the prior art.

Accordingly, it is an object of the present invention to provide a new fruit picking apparatus.

Another object of the present invention is to provide a fruit picking apparatus which will easily penetrate dense foliage.

And another object of the present invention is to provide a fruit picking apparatus which can be used to pick many different types of fruit.

Still another object of the present invention is to provide a fruit picking apparatus which can hold a plurality of fruit.

Yet another object of the present invention is to provide a fruit picking apparatus which easily separates fruit from the tree.

Yet still another object of the present invention is to provide a fruit picking attachment which can be attached to many types of commonly available shafts.

A further object of the present invention is to provide a fruit picking apparatus which is durable and inexpensive.

And a further object of the present invention is to provide a fruit picking apparatus which allows fruit to be removed from the tree without a twisting motion.

Yet a further object of the present invention is to provide a fruit picking apparatus which protects the fruit from damage while being picked.

And yet a further object of the present invention is to provide a fruit picking apparatus of unitary construction and thus having substantially no projections such as connectors or seams to inhibit penetration of the fruit picker through foliage of a tree.

SUMMARY OF THE INVENTION

Briefly, to achieve the desired objects of the present invention in accordance with a preferred embodiment thereof, provided is a fruit picking apparatus for easily penetrating foliage to access fruit, and for removing fruit from a stem. The apparatus includes a generally cylindrical receptacle formed as a one piece construction and having a closed upper end, a closed lower end and a side wall extending therebetween. The upper end and the lower end are sloped to facilitate penetration of foliage, and an opening for receiving fruit is formed in the side wall intermediate the upper end and the lower end and terminating proximate the upper end with a convergent slot extending in the direction of the upper end. The apparatus further includes a shaft and a threaded socket extending from the lower end of the receptacle along a longitudinal axis, for removably receiving a threaded end of the shaft.

The fruit picking apparatus may further include a bracket mounted to an inner surface of the receptacle for removably receiving a back edge of a blade, and positioning the blade across the convergent slot with a cutting edge in a direction toward the lower end.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which:

FIG. 1 is a perspective view of a fruit picker constructed in accordance with the teaching of the present invention, as it would appear harvesting a fruit from a branch;

FIG. 2 is a partial sectional front plan view of the fruit picking apparatus of FIG. 1;

FIG. 3 is an enlarged partial view illustrating a cutting blade mounted to the fruit picking apparatus of FIGS. 1 and 2;

FIG. 4 is a perspective view illustrating another embodiment of a fruit picking apparatus; and FIG. 5 is a front plan view illustrating yet another embodiment of a fruit picking apparatus.

DETAILED DESCRIPTION OF THE PREFERRED EMBODIMENT

Turning now to the drawings, in which like reference characters indicate corresponding elements throughout the several views, attention is first directed to FIG. 1 which illustrates a fruit picking apparatus, generally designated by the reference numeral 10. Fruit picking apparatus 10 includes an attachment 12 coupled to a shaft 13 for extending an individual's reach. Shaft 13 permits a fruit picking individual to remain standing on the ground while maneuvering attachment 12 to the location of a fruit 14 coupled to a branch 15 by a stem 17. Attachment 12 includes a receptacle 18 being of generally cylindrical shape and having a closed and rounded upper end 19, a closed and rounded lower end 20 and a side wall 22 extending therebetween. An opening 23 is formed in receptacle 18 through side wall 22 intermediate rounded upper end 19 and rounded lower end 20. Opening 23 is configured to receive fruit therethrough, and includes a convergent slot 24 at its upper end. Convergent slot 24 extends in a direction toward rounded upper end 19 and is configured to receive a stem therein when a fruit is positioned in rounded upper end 19.

As can be seen with additional reference to FIG. 2, attachment 12 includes a socket 25 extending from rounded lower end 20 preferably substantially along a longitudinal axis of the generally cylindrical receptacle 18. In this preferred embodiment, socket 25 is threaded for mating engagement with a threaded end 27 of shaft 13. Employing this type of attachment permits a variety of shafts to be employed. Included are extendable or telescoping shafts, broom sticks etc. Many shafts which are readily available have threaded ends and may be employed with attachment 12. This permits greater flexibility of use, allowing shafts to be interchanged. Shorter shafts which are easily wielded may be employed for shorter trees, while longer or telescoping shafts may be employed for taller trees.

Still referring to FIGS. 1 and 2, an individual grasps shaft 13 and, using a vertical upward movement, moves receptacle 18 through the branches of the tree to the location of the fruit. Receptacle 18 is then moved to engulf the fruit, the fruit being received through opening 23. Once the fruit has been received within receptacle 18 a vertical downward movement of receptacle 18 moves the fruit into rounded upper end 19 and the stem into convergent slot 24. A continued downward movement separates the fruit from the stem and the fruit drops into rounded lower end 20. This distance is very slight, and unlikely to damage the fruit. The round shape of lower end 20 substantially evenly distributes the impact force of the falling fruit to a greater surface area of the fruit than would occur if dropped on a flat bottom. This further mitigates bruising and damage to the fruit. It has also been contemplated that a liner may be added to the interior surface of receptacle 18 to further cushion picked fruit.

The unique shape of receptacle 18, namely the rounded configuration of upper end 19 and lower end 20, permits penetration by attachment 12 of dense foliage found in many fruit trees and common in citrus trees. Rounded upper end 19 and the side placement of opening 23 allows attachment 12 to be forced upward through dense foliage, pushing branches aside and gaining access to fruit which is otherwise unreachable. Rounded lower end 20 and the side placement of opening 23 allows retraction of attachment from within the foliage after a fruit has been picked. In both direction, movement through dense foliage is facilitated by the generally smooth construction of attachment 12. There is no top opening, projecting fruit detaching elements, or flat surfaces which may engage branches and hinder movement. Furthermore, attachment 12 is preferably constructed of plastic in a one piece construction. Therefore, any attachment or coupling elements such as projecting screws or bolts, and welds or seams are eliminated. The generally smooth outer surface of attachment 12 provides nothing for branches to snag on and hinder penetration. One skilled in the art will understand, however, that other materials may be used.

Directing attention to FIG. 3, an additional element may be added to attachment 12. The additional element is a cutting device such as a blade 29. In this specific embodiment, blade 29 has a back edge 30 and a cutting edge 32. Blade 29 is securely positioned with cutting edge 32 extending across convergent slot 24 and directed in a downward direction toward rounded lower end 20. Blade 29 is secured by a bracket 33 coupled to the inner surface of receptacle 18 which receives and retains back edge 30 of blade 29. Bracket 33 is shown as a clip for removable receiving blade 29. Blade 29 facilitates separation of a fruit from a stem by cutting the stem during the downward movement of attachment 12 instead of pulling it loose. As quantities of fruit are picked and stems severed, a blade that has become dulled may be easily and quickly replaced.

Turning now to FIG. 4, another embodiment of an attachment generally designated 35 is shown to illustrate an example of a different possible variation. Attachment 35 is generally identical to attachment 12, including a receptacle 37 being of generally cylindrical shape and having a rounded upper end 39, a rounded lower end 40 and a side wall 42 extending therebetween. An opening 43 is formed in receptacle 37 through side wall 42 intermediate rounded upper end 39 and rounded lower end 40. Opening 43 is configured to receive fruit therethrough, and includes a convergent slot 44 at its upper end. Convergent slot 44 extends in a direction toward rounded upper end 39 and is configured to receive a stem therein when a fruit is positioned in rounded upper end 39. Attachment 35 differs from attachment 12, in that receptacle 37 is made thinner and less rigid. This necessitates a support structure increasing the strength and rigidity of receptacle 37. In this instance, receptacle 37 is molded from plastic as a unitary structure having vertical ribs 45 for added strength. Vertical ribs 45 are employed as opposed to horizontal ribs because vertical ribs will not catch or snag branches during the vertical penetration or removal of attachment 35 form dense foliage.

Yet another embodiment of an attachment generally designated 50 is illustrated in FIG. 5 as a further example of a possible variation. Again, this embodiment is substantially similar to attachments 12 and 35, and includes a receptacle 58 being of generally cylindrical shape, but differing in that receptacle 58 has a generally conical upper end 59, generally conical lower end 60 and a side wall 62 extending therebetween. Attachment 50 further includes an opening 63 formed in receptacle 58 through side wall 62 intermediate conical upper end 59 and conical lower end 60. Opening 63 is configured to receive fruit therethrough, and includes a convergent slot 64 at its upper end. Convergent slot 64 extends in a direction toward conical upper end 59 and is configured to receive a stem therein when fruit is positioned in conical upper end 59. Attachment 50 is intended to illustrate that other shapes, having sloped ends which facilitate penetration of dense foliage, may be used.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A fruit picking apparatus for easily penetrating foliage to access fruit, and for removing fruit from a stem, said apparatus comprising:

a receptacle having a closed upper end and a closed lower end, said upper end and said lower end sloped to facilitate penetration of foliage;

an opening for receiving fruit formed in said receptacle intermediate said upper end and said lower end and terminating proximate said upper end with a convergent slot extending in the direction of said upper end;

a shaft; and attachment means for attaching said receptacle to said shaft.

2. An apparatus as claimed in claim 1 wherein said receptacle is generally cylindrical.

3. An apparatus as claimed in claim 2 wherein said upper end and said lower end are rounded.

4. An apparatus as claimed in claim 2 wherein said upper end and said lower end are conical.

5. An apparatus as claimed in claim 2 wherein said receptacle is formed from plastic in a one piece construction.

6. An apparatus as claimed in claim 1 wherein said attachment means includes a threaded socket for removably receiving a threaded end of said shaft.

7. An apparatus as claimed in claim 1 further including cutting means for separating a fruit from a stem.

8. An apparatus as claimed in claim 7 wherein said cutting means includes a blade fitted within said convergent slot proximate said upper end.

9. An apparatus as claimed in claim 8 wherein said cutting means further includes a bracket mounted to an inner surface of said receptacle for removably receiving a back edge of said blade, and positioning said blade across said convergent slot with a cutting edge in a direction toward said lower end.

10. A fruit picking attachment for easily penetrating foliage to access fruit, and for removing fruit from a stem, said apparatus comprising:

a receptacle having a closed upper end and a closed lower end, said upper end and said lower end sloped to facilitate penetration of foliage;

an opening for receiving fruit formed in said receptacle intermediate said upper end and said lower end and terminating proximate said upper end with a convergent slot extending in the direction of said upper end; and said attachment being adapted to be removable attachable to a shaft.

11. An attachment as claimed in claim 10 wherein said receptacle is generally cylindrical.

12. An attachment as claimed in claim 11 wherein said upper end and said lower end are rounded.

13. An attachment as claimed in claim 11 wherein said upper end and said lower end are conical.

14. An attachment as claimed in claim 11 wherein said receptacle is formed from plastic in a one piece construction.

15. An attachment as claimed in claim 10 further including a threaded socket extending from said lower end for removably receiving a threaded end of a shaft.

16. An attachment as claimed in claim 10 further including cutting means for separating a fruit from a stem.

17. An attachment as claimed in claim 16 wherein said cutting means includes a blade fitted within said convergent slot proximate said upper end.

18. An attachment as claimed in claim 17 wherein said cutting means further includes a bracket mounted to an inner surface of said receptacle for removably receiving a back edge of said blade, and positioning said blade across said convergent slot with a cutting edge in a direction toward said lower end.

19. A fruit picking apparatus for easily penetrating foliage to access fruit, and for removing fruit from a stem, said apparatus comprising:

a generally cylindrical receptacle formed as a one piece construction and having a closed upper end, a closed lower end and a side wall extending therebetween, said upper end and said lower end sloped to facilitate penetration of foliage;

an opening for receiving fruit formed in said side wall intermediate said upper end and said lower end and terminating proximate said upper end with a convergent slot extending in the direction of said upper end;

a shaft; and a threaded socket extending from said lower end of said receptacle along a longitudinal axis, for removably receiving a threaded end of said shaft.

20. An apparatus as claimed in claim 19 further including a bracket mounted to an inner surface of said receptacle for removably receiving a back edge of a blade, and positioning said blade across said convergent slot with a cutting edge in a direction toward said lower end.

* * * * *